US012099557B2

(12) United States Patent
Hasegawa et al.

(10) Patent No.: US 12,099,557 B2
(45) Date of Patent: Sep. 24, 2024

(54) ARCHIVED DATA CRAWLING (71) Applicant: International Business Machines Corporation, Armonk, NY (US)

(72) Inventors: Tohru Hasegawa, Tokyo (JP); Takuya Goto, Tokyo (JP); Asako Ono, Tokyo (JP); Xiangning Liu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 17/464,731

(22) Filed: Sep. 2, 2021

(65) Prior Publication Data
US 2023/0071548 A1      Mar. 9, 2023

(51) Int. Cl.
*G06F 16/00* (2019.01)
*G06F 16/11* (2019.01)
*G06F 16/2458* (2019.01)
*G06F 16/951* (2019.01)
*G06Q 30/04* (2012.01)

(52) U.S. Cl.
CPC .......... *G06F 16/951* (2019.01); *G06F 16/113* (2019.01); *G06F 16/116* (2019.01); *G06F 16/2465* (2019.01); *G06Q 30/04* (2013.01); *G06F 2216/03* (2013.01)

(58) Field of Classification Search
None
See application file for complete search history.

(56) References Cited

U.S. PATENT DOCUMENTS

| | | | | |
|---|---|---|---|---|
| 7,010,526 | B2* | 3/2006 | Denesuk | G06F 16/9532 |
| 7,693,872 | B2* | 4/2010 | Gorodyansky | G10L 15/26 |
| | | | | 707/999.107 |
| 8,554,738 | B2* | 10/2013 | Marshall | G06Q 10/10 |
| | | | | 707/661 |
| 8,639,773 | B2* | 1/2014 | Shyamkumar | G06F 16/951 |
| | | | | 709/217 |
| 8,707,008 | B2* | 4/2014 | Lowe | H04L 63/123 |
| | | | | 709/224 |
| 9,002,777 | B1* | 4/2015 | Muddu | G06F 7/00 |
| | | | | 707/694 |

(Continued)

FOREIGN PATENT DOCUMENTS

| | | | | |
|---|---|---|---|---|
| CN | 110633429 | A | * | 12/2019 |
| CN | 110929128 | A | * | 3/2020 |
| CN | 111898011 | A | * | 11/2020 |

OTHER PUBLICATIONS

Izawa et al., "Speeding up Analysis of Archived Sensor Data with Columnar Layout for Tape", Published Date: NA, 7 pages.

(Continued)

*Primary Examiner* — Jean M Corrielus
(74) *Attorney, Agent, or Firm* — Stosch Sabo (57) ABSTRACT

Described is a content mining system comprising a crawler configured to retrieve a plurality of files from a data storage system. The content mining system further comprises a plurality of converters configured to extract data from the plurality of files retrieved by the crawler from the data storage system, where each of the plurality of converters is configured to process a respective type of data. The content mining system further comprises a plurality of queues interposed between the crawler and the plurality of converters, where each queue is associated with a single converter.

15 Claims, 7 Drawing Sheets

(56) References Cited

U.S. PATENT DOCUMENTS

| | | | |
|---|---|---|---|
| 9,135,261 B2* | 9/2015 | Maunder | G06F 16/134 |
| 9,239,874 B1* | 1/2016 | Madany | G06F 16/22 |
| 10,169,345 B2 | 1/2019 | Wideman | |
| 10,713,272 B1* | 7/2020 | Caldwell | G06F 16/2358 |
| 11,695,830 B1* | 7/2023 | Pal | G06F 16/951 |
| | | | 709/213 |
| 2006/0047675 A1* | 3/2006 | Lowe | H04L 63/123 |
| 2008/0046240 A1* | 2/2008 | Gorodyansky | G10L 15/26 |
| | | | 704/235 |
| 2010/0241615 A1* | 9/2010 | Marshall | G06F 16/116 |
| | | | 707/661 |
| 2010/0268700 A1* | 10/2010 | Wissner | G06F 16/2465 |
| | | | 707/706 |
| 2010/0299306 A1* | 11/2010 | Agetsuma | G06F 16/1734 |
| | | | 718/1 |
| 2011/0167212 A1* | 7/2011 | Lowe | H04L 63/123 |
| | | | 711/E12.001 |
| 2011/0252427 A1* | 10/2011 | Olston | G06F 16/951 |
| | | | 718/102 |
| 2012/0131139 A1* | 5/2012 | Siripurapu | H04L 65/60 |
| | | | 709/217 |
| 2013/0031143 A1* | 1/2013 | Katiyar | G06F 16/951 |
| | | | 707/E17.03 |
| 2014/0280010 A1* | 9/2014 | Ravipati | G06F 16/14 |
| | | | 707/709 |
| 2015/0022917 A1 | 1/2015 | Ashida et al. | |
| 2016/0036903 A1* | 2/2016 | Pal | H04L 67/1087 |
| | | | 709/213 |
| 2016/0259785 A1* | 9/2016 | Brown | G06F 16/901 |
| 2017/0017545 A1* | 1/2017 | Tanabe | H03M 13/154 |
| 2017/0032040 A1* | 2/2017 | Kaneko | H04L 47/521 |
| 2017/0039255 A1* | 2/2017 | Raj | G06F 16/2365 |
| 2017/0220651 A1* | 8/2017 | Mathew | G06F 16/285 |
| 2017/0322838 A1* | 11/2017 | Winters | G06F 11/0793 |
| 2017/0351713 A1* | 12/2017 | Chamberlain | G06F 16/5838 |
| 2017/0351763 A1* | 12/2017 | Ekambaram | G06F 16/9536 |
| 2018/0007180 A1* | 1/2018 | Pal | H04L 67/561 |
| 2018/0039513 A1* | 2/2018 | Zhao | G06F 9/542 |
| 2018/0081887 A1 | 3/2018 | Ahn et al. | |
| 2018/0357334 A1* | 12/2018 | Chao | G06F 16/10 |
| 2019/0188188 A1 | 6/2019 | Kottomtharayil et al. | |
| 2021/0058457 A1* | 2/2021 | Pal | G06F 15/167 |
| 2021/0117289 A1* | 4/2021 | Lin | G06F 11/1453 |
| 2021/0264480 A1* | 8/2021 | Silverstein | H04L 67/02 |

OTHER PUBLICATIONS

Oracle, "Crawls and archive files", Oracle® Endeca CAS Developer's Guide, Version 3.0.2, Mar. 2012, 3 pages.

McCelland, B., "Designing a high performance tape archive", Jul. 20, 2018, 12 pages.

Mell et al., "The NIST Definition of Cloud Computing", Recommendations of the National Institute of Standards and Technology, Sep. 2011, 7 pages.

* cited by examiner

ARCHIVED DATA CRAWLING

BACKGROUND

The present disclosure relates to data mining, and, more specifically, to processing crawled data using a plurality of queues respectively associated with a plurality of converters in a content mining system.

Data crawling, data scraping, web crawling, and web scraping all refer to aggregating large amounts of data. Data can be aggregated from an intranet, the Internet, production data storage systems, backup data storage systems, and/or archival data storage systems. The aggregated data can be used for analytics, machine learning, model building, and/or Artificial Intelligence training. More generally, aggregating large amounts of data from disparate sources can be useful for generating insights and/or predictions that would not otherwise be possible.

SUMMARY

Aspects of the present disclosure are directed toward a content mining system comprising a crawler configured to retrieve a plurality of files from a data storage system. The content mining system further comprises a plurality of converters configured to extract data from the plurality of files retrieved by the crawler from the data storage system, where each of the plurality of converters is configured to process a respective type of data. The content mining system further comprises a plurality of queues interposed between the crawler and the plurality of converters, where each queue is associated with a single converter.

Further aspects of the present disclosure are directed toward a computer-implemented method of aggregating, by a crawler, a plurality of files with a plurality of file types from a data storage system. The method further comprises providing the plurality of files to a plurality of queues interposed between the crawler and a plurality of converters, where files with a respective file type are sent to respective queues corresponding to a converter configured to process the files with the respective file type. The method further comprises extracting data from the plurality of files by the plurality of converters, where the plurality of converters incrementally process the plurality of files using the plurality of queues.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward to data mining, and, more specifically, to processing crawled data using a plurality of queues respectively associated with a plurality of converters in a content mining system. While not limited to such applications, embodiments of the present disclosure may be better understood in light of the aforementioned context.

Software products such as Watson Explorer and Watson Discovery Advisor® (products of International Business Machines Corporation) can be used to analyze documents and/or data for content mining. Content mining products can evaluate various kinds of documents and/or files by extracting data from the various kinds of documents and/or files using different types of converters. For example, various converters can extract text data and metadata using particular techniques for particular file types.

As one example, a Comma Separated Values (CSV) converter can extract data from CSV files by dividing data into lines. As another example, a JavaScript® Object Notation (JSON) converter can extract data from JSON files by dividing arrays in the JSON file. As yet another example, a HyperText Markup Language (HTML) converter can extract data from HTML files by analyzing an HTML tag to extract text data and a title from the HTML files. As yet another example, a Smart Document Understanding (SDU) converter can extract data from document files such as Portable Document Format (PDF), Microsoft Word files, Microsoft Excel files, Microsoft PowerPoint files, and the like.

However, the crawler collecting data and the converters extracting data each process data at different rates. Specifically, the converters use more CPU and memory capacity compared to the crawlers, and this can result in a slower processing rate of the converters relative to the crawlers. As a result, a queue can be placed between the crawler and the converters to store an accumulation of crawled data that is ready for data extraction by the converters.

As previously discussed, different converters can be used for different file types. Disadvantageously, if there is a consecutive series of crawled data with a same file type, then converters corresponding to other file types can be left unused while the queue sequentially works through the consecutive series of crawled data with the same file type. In other words, a single queue feeding a plurality of converters can result in inefficient processing of crawled data insofar as some converters may experience significant downtime while waiting for the single queue to work through a consecutive series of a certain type of file.

In one workaround to the above disadvantage, the converters can be dynamically changed to work through the consecutive series of crawled data with a same file type. However, different converters have different CPU and/or memory requirements, thereby making it difficult to estimate CPU and/or memory required to sufficiently resource the dynamically modified converters. In other words, a queue for a first file type that is dynamically modified to extract data from a second file type can be under resourced (and thereby inefficient) at effectively extracting data from the second file type.

In another workaround to the above disadvantage, the crawler can be suspended when the queue exceeds a predetermined threshold and restarted when the queue falls below the predetermined threshold. However, in the case of a crawler collecting data from a tape storage system, while data is read from the tape, physical movement of the head cannot be stopped even when the reading can be temporarily suspended. In this case, repositioning of the head will occur when resuming reading, and thus it takes longer to restart reading. Thus, suspending the crawler is inefficient due to both the downtime of the suspended crawler and the inefficiencies introduced by moving the head during restarts in tape storage systems. It is possible to throttle the crawler to collect data at a slower speed, where the slower speed matches a capacity of a single queue to work through a consecutive series of similar file types (whereby throttling the crawler reduces or removes the need to suspend it and the associated start/stop inefficiencies). However, throttling the crawler is obviously inefficient.

Aspects of the present disclosure are directed to overcoming the aforementioned disadvantages and deficient workarounds. In some embodiments, aspects of the present disclosure read and crawl data in one direction on a tape storage system to avoid rewinding tap. Furthermore, aspects of the present disclosure can provide a plurality of queues for different file types to avoid an overaccumulation of a sequence of a same file type in a single queue feeding to plurality of converters.

Figure 1:
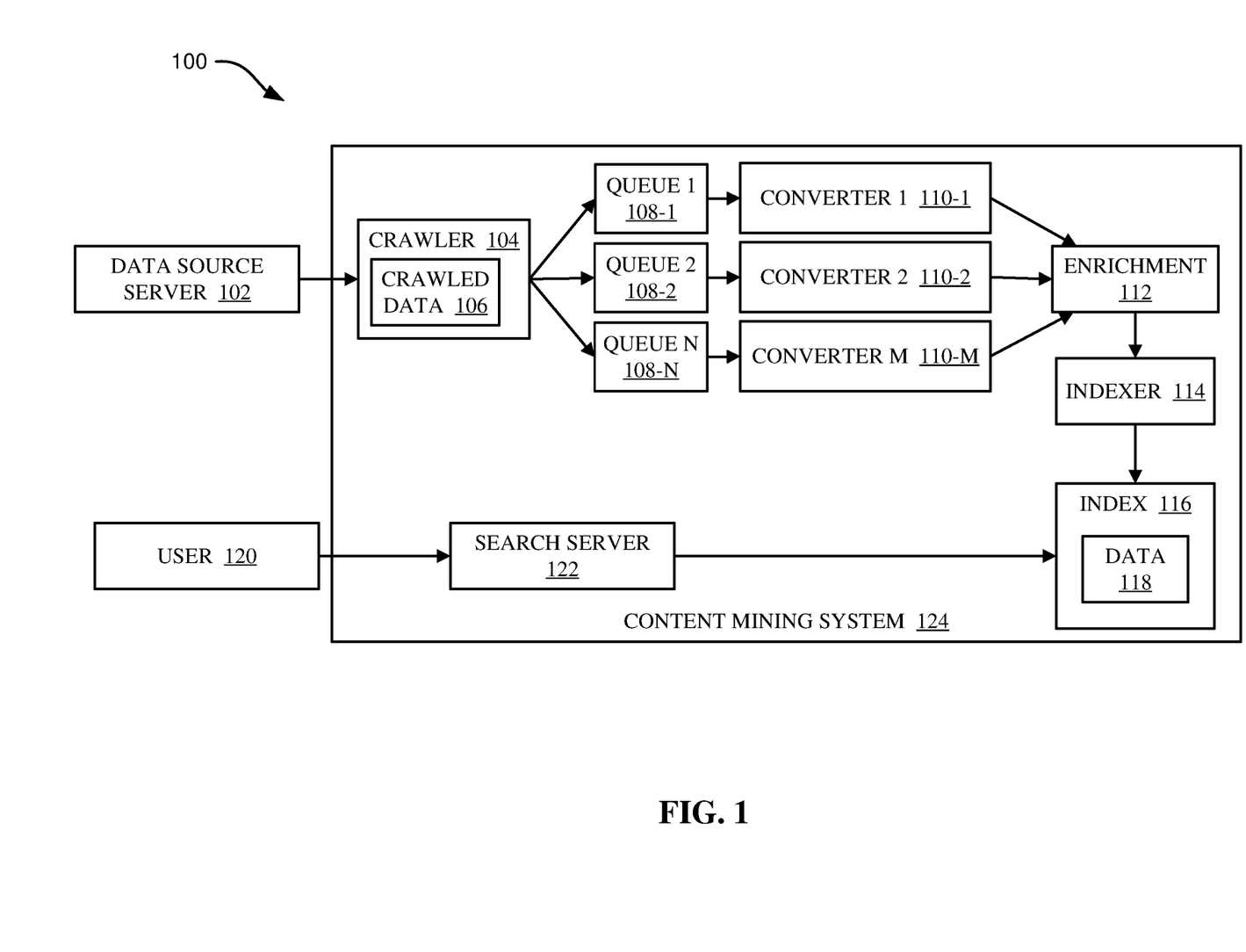
FIG. 1 illustrates a block diagram of an example computational environment for content mining using a plurality of queues respectively associated with a plurality of converters, in accordance with some embodiments of the present disclosure.

Referring now to the figures, FIG. 1 illustrates a block diagram of an example computational environment 100 for content mining using a plurality of queues 108 interposed between a crawler 104 and a plurality of converters 110, in accordance with some embodiments of the present disclosure. The computational environment 100 for content mining can include a content mining system 124. The content mining system 124 can use crawler 104 to generate crawled data 106 that is retrieved from a data source server 102. The crawler 104 can be a software module configured to access a data storage system and crawl documents and/or files from the accessed data storage system. In some embodiments, the data source server 102 can include a content management system, a file server, a tape storage system, a disk storage system, or another data storage system that stores files and/or documents.

The crawler 104 can pass the crawled data 106 to a plurality of queues 108 (e.g., queue 1 108-1, queue 2 108-2, and/or queue N 108-N where N is any integer representing any number of queues). The queues 108 can be respectively associated with converters 110 (e.g., converter 1 110-1, converter 2 110-2, and converter M 110-M, where M is any integer representing any number of converters). In some embodiments, there is an equal number of queues 108 and converters 110 (e.g., N=M) such that each queue 108 is associated with one and only one converter 110. The converters 110 can be software modules configured to extract text data and/or metadata (e.g., file names) from the crawled data 106.

In some embodiments, respective converters 110 are dedicated to extracting data from certain file types (e.g., converter 1 110-1 is dedicated to CSV files, converter 2 110-2 is dedicated to JSON files, and the like). In such embodiments, respective queues 108 can be customized to a particular size based on processing speed characteristics for the corresponding converter 110 (discussed in more detail hereafter with respect to FIG. 2). Whatever the size of the queues 108, the queues 108 can incrementally pass accumulated files to a corresponding converter 110 for processing.

The converters 110 can pass extracted data to enrichment 112. Enrichment 112 can be a software module configured to analyze extracted data and add information to the extracted data (e.g., parts of speech (POS) tagging, sentiment, etc.). The enriched data generated by enrichment 112 can be passed to indexer 114. Indexer 114 can be a software module configured to create an index 116 for searching content of the enriched data received from enrichment 112. The index 116 can be accessed by a user 120 via a search server 122. The search server 122 can match search parameters provided by the user 120 to relevant data 118 in the index 116. The search server 122 can then return the relevant data 118 to the user 120.

Advantageously, the content mining system 124 realizes improved efficiencies relative to other content mining systems. For example, the index 116 generated from the crawled data 106 can be built faster insofar as a plurality of queues 108 are used, where the plurality of queues 108 are respectively associated with converters 110 configured to extract data from predetermined file types. By using the plurality of queues 108, aspects of the present disclosure overcome queue backlogs realized by a single queue processing a sequence of files with a same file type. Furthermore, by using the plurality of queues 108, aspects of the present disclosure do not need to throttle or suspend the crawler 104. This is advantageous when the crawler 104 includes, at least in part, a head of a tape drive system that exhibits increased inefficiency with increasing amounts of interrupted (e.g., start/stop) reading.

Figure 2:
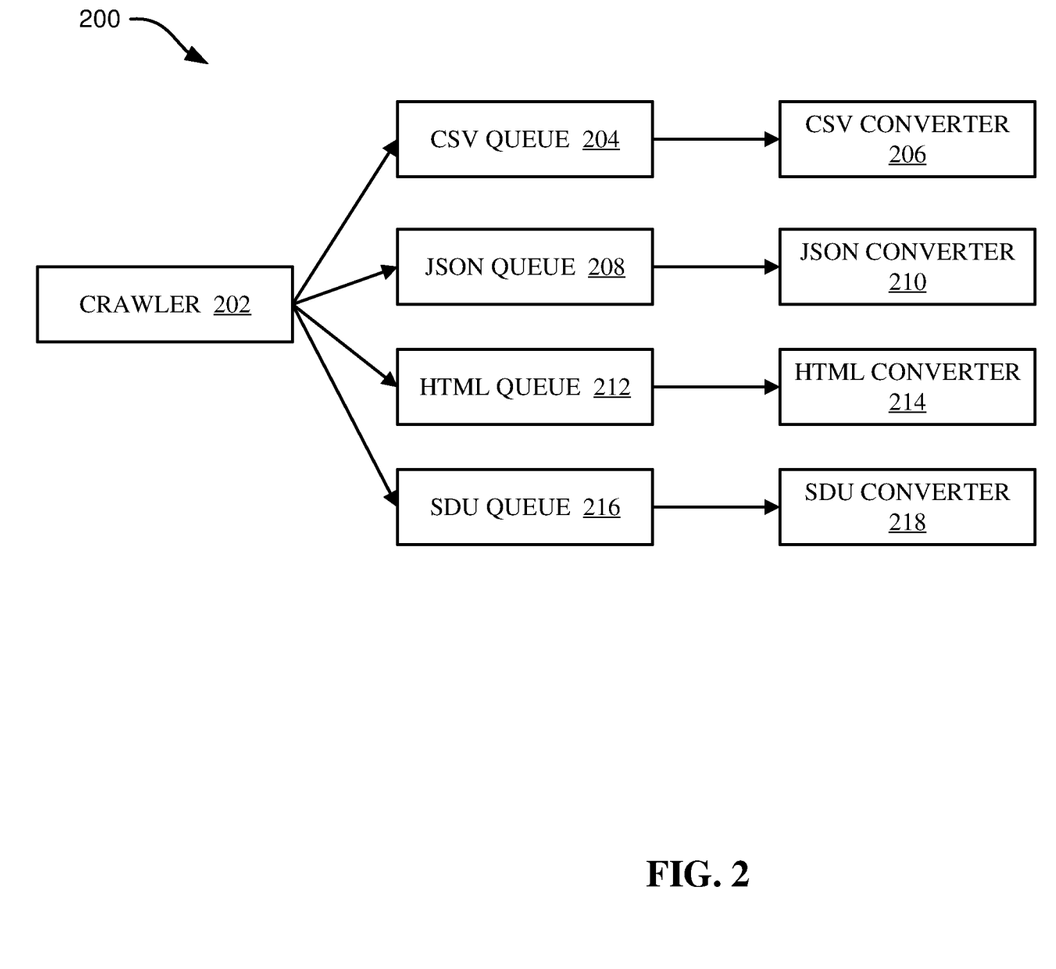
FIG. 2 illustrates a block diagram of example queues interposed between a crawler and a plurality of converters in a content mining system, in accordance with some embodiments of the present disclosure.

FIG. 2 illustrates a block diagram of a subsystem 200 having queues interposed between a crawler and a plurality of converters in a content mining system, in accordance with some embodiments of the present disclosure. In some embodiments, crawler 202 is consistent with crawler 104 of FIG. 1. In some embodiments, CSV queue 204, JSON queue 208, HTML queue 212, and SDU queue 216 are consistent with queues 108 of FIG. 1. In some embodiments, CSV converter 206, JSON converter 210, HTML converter 214, and SDU converter 218 are consistent with converters 110 of FIG. 1.

Subsystem 200 can be a subsystem of a content mining system such as content mining system 124 of FIG. 1. In some embodiments, subsystem 200 can be included in any product configured to analyze, process, read, evaluate, organize, or otherwise manipulate large amounts of data and using various converters.

The crawler 202 can send crawled data to each of the queues such that a file type of the crawled data matches the file type the corresponding converter is configured to process. For example, crawler 202 can send CSV files to CSV queue 204, and the CSV queue 204 can feed the accumulated CSV files to the CSV converter 206. Similarly, the crawler 202 can send JSON files to JSON queue 208, and JSON queue 208 can feed the accumulated JSON files to the JSON converter 210. Further, the crawler 202 can send HTML files to HTML queue 212, and HTML queue 212 can feed the accumulated HTML files to the HTML converter 214. Further, the crawler 202 can send other predetermined files (e.g., PDF files, Microsoft Word files, Microsoft Excel files, Microsoft PowerPoint files, etc.) to SDU queue 216, and SDU queue 216 can feed the accumulated files to the SDU converter 218. As will be appreciated by one skilled in the art, the aforementioned types of queues, converters, and files are for example purposes only, and should not be construed as limiting. In other embodiments, more, fewer, and/or different queues, converters, and/or files can be used while remaining within the spirit and scope of the present disclosure.

The sizes of CSV queue 204, JSON queue 208, HTML queue 212, and SDU queue 216 can be customized based on the processing time of the corresponding converter. For example, hypothetical processing times of various converters are shown in Table 1:

TABLE 1

EXAMPLE AVERAGE PROCESSING TIMES OF VARIOUS CONVERTERS

| Converter | Time (second) |
|---|---|
| JSON Converter | 1 |
| HTML Converter | 2 |
| CSV Converter | 5 |
| SDU Converter | 10 |

The sizes of CSV queue 204, JSON queue 208, HTML queue 212, and SDU queue 216 can be customized based on the processing times shown in Table 1 such that converters with relatively shorter (e.g., faster) processing times per file can have a relatively larger number of files queued in their corresponding queue, and, conversely, converters with relatively longer (e.g., slower) processing times per file can have a relatively smaller number of files queued in their corresponding queue. As an example, Table 2 illustrates example queue sizes for the various converters based on an algorithm such as dividing one hundred by the average processing time:

TABLE 2

EXAMPLE QUEUE SIZES

| Converter | Queue Size |
|---|---|
| JSON Converter | 100 |
| HTML Converter | 50 |
| CSV Converter | 20 |
| SDU Converter | 10 |

As can be seen from Table 1 and Table 2, queue size can be inversely related to the processing speed of the corresponding converter. Said another way, a first queue associated with a first converter having a larger (e.g., slower) processing speed will be configured to store fewer files than a second queue associated with a second converter having a faster (e.g., smaller) processing speed.

Figure 3:
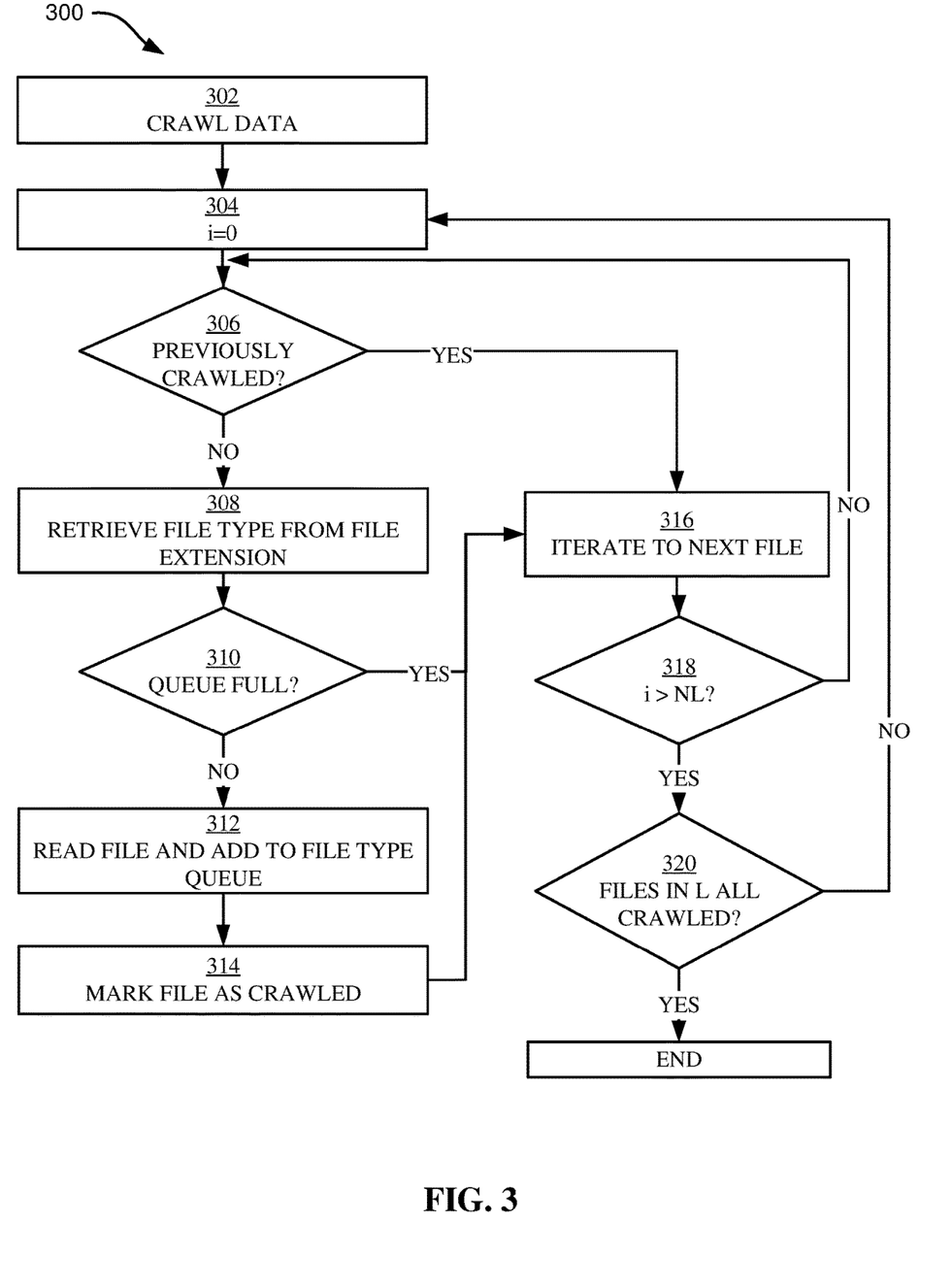
FIG. 3 illustrates a flowchart of an example programmatic method for processing crawled data using a plurality of queues respectively associated with a plurality of converters, in accordance with some embodiments of the present disclosure.

FIG. 3 illustrates a flowchart of an example programmatic method 300 for processing crawled data using a plurality of queues respectively associated with a plurality of converters, in accordance with some embodiments of the present disclosure. The method 300 can be implemented by, for example, a content mining system 124 of FIG. 1, a subsystem 200 of FIG. 2, a computer, a server, a processor, or another combination of hardware and/or software.

Operation 302 includes crawling data. Operation 302 can be performed by, for example, a crawler such as crawler 104 of FIG. 1 or crawler 202 of FIG. 2. In some embodiments, operation 302 includes preparing, by the crawler, a list (e.g., L1) by arranging all files on a tape drive in order based on the starting offset as shown in Table 3:

TABLE 3

EXAMPLE LIST L1

| # | Path | starting offset | Ingested |
|---|---|---|---|
| 1 | /dir1/file1.pdf | 10 | N |
| 2 | /dir2/file2.pdf | 50 | N |
| 3 | /dir2/dir2-1/file3.html | 120 | N |
| ... | | | |
| ... | | | |
| NL | /dir/file.json | 4000 | N |

As shown in Table 3, files can be arranged in column "#", a path for each file can be specified, and a starting offset can be specified. Further, whether files are already crawled is recorded in the "ingested" column (where a flag such as "N" can refer to not crawled and/or a flag such as "Y" can refer to already crawled). As shown in Table 3, there can be a total of NL files to be crawled.

In some embodiments, the data shown in Table 3 is aggregated from data stored in one or more tape drives of a tape drive storage system. In some embodiments, the one or more tape drives can be formatted in a Linear Tape File System (LTFS) format. Using the LTFS format, tape drives can be managed and accessed using, for example, Spectrum Archive Single Drive Edition (SDE) (a product of International Business Machines Corporation). In particular, a file name (e.g., "#" in Table 3) and a position on a tape (e.g., the starting offset shown in Table 3) at which respective files are stored can be obtained using an Application Programming Interface (API) tape management command such as POSIX.

In Linear Tape-Open (LTO) tapes supported by LTFS, a width direction can be divided into wraps and each wrap stores data from the beginning to the end and from the end to the beginning in a longitudinal direction. In other words, LTO tapes supported by LTFS can write data in the direction from the beginning to the end, and, upon reaching the end, switch the wrap to write data in the direction from the end to the beginning. As a result, aspects of the present disclosure are useful for increasing efficiency in crawling and converting large amounts of tape drive data insofar as (i) a plurality of queues are used (to reduce the need to suspend/restart the tape drive head), and (ii) the files are read by sequentially ordered starting offset (for efficient movement of the tape drive head).

Operation 304 includes setting i=0 (e.g., beginning with an initial file illustrated in Table 3). Operation 306 includes determining if the selected file has already been crawled (e.g., by querying the "ingested" column of Table 3). If not (306: NO), then the method 300 proceeds to operation 308 where a file type can be retrieved from the file extension of the selected file.

Operation 310 can include determining whether or not the queue corresponding to the retrieved file type is full (e.g., CSV queue 204 for a CSV file, JSON queue 208 for a JSON file, HTML queue 212 for a HTML file, SDU queue 216 for a predefined document file, or another queue for a different type of file). If not (310: NO), then the method 300 proceeds to operation 312 and reads the file and adds the file to the appropriate queue. Operation 314 can then include marking the file as crawled (e.g., by updating a value in the "ingested" column of Table 3).

After operation 314, the method can proceed to operation 316. Furthermore, if the queue is determined to be full in operation 310 (e.g., 310: YES) or if the selected file is determined to have previously been crawled in operation 306 (e.g., 306: YES), then the method 300 proceeds directly to operation 316. Operation 316 includes iterating to a next file. In some embodiments, operation 316 queries Table 3 to identify the next file, where the next file can be a file with a next starting offset to a current offset in a tape drive system.

Operation 318 includes determining if the next file is greater than NL. In other words, operation 318 determines if the end of the list of files shown in Table 3 is reached. If not (318: NO), then the method returns to operation 306 with the next iterated file as the selected file. If so (318: YES), then the method 300 proceeds to operation 320 and determines if files in list L1 are all crawled (e.g., by determining whether or not every file is associated with a crawled flag in the "ingested" column of Table 3). If so (320: YES), then the method 300 ends. If not (320: NO), then the method 300 returns to operation 304 and iterates through the files again (starting with an initial file) until all files are crawled.

Figure 4:
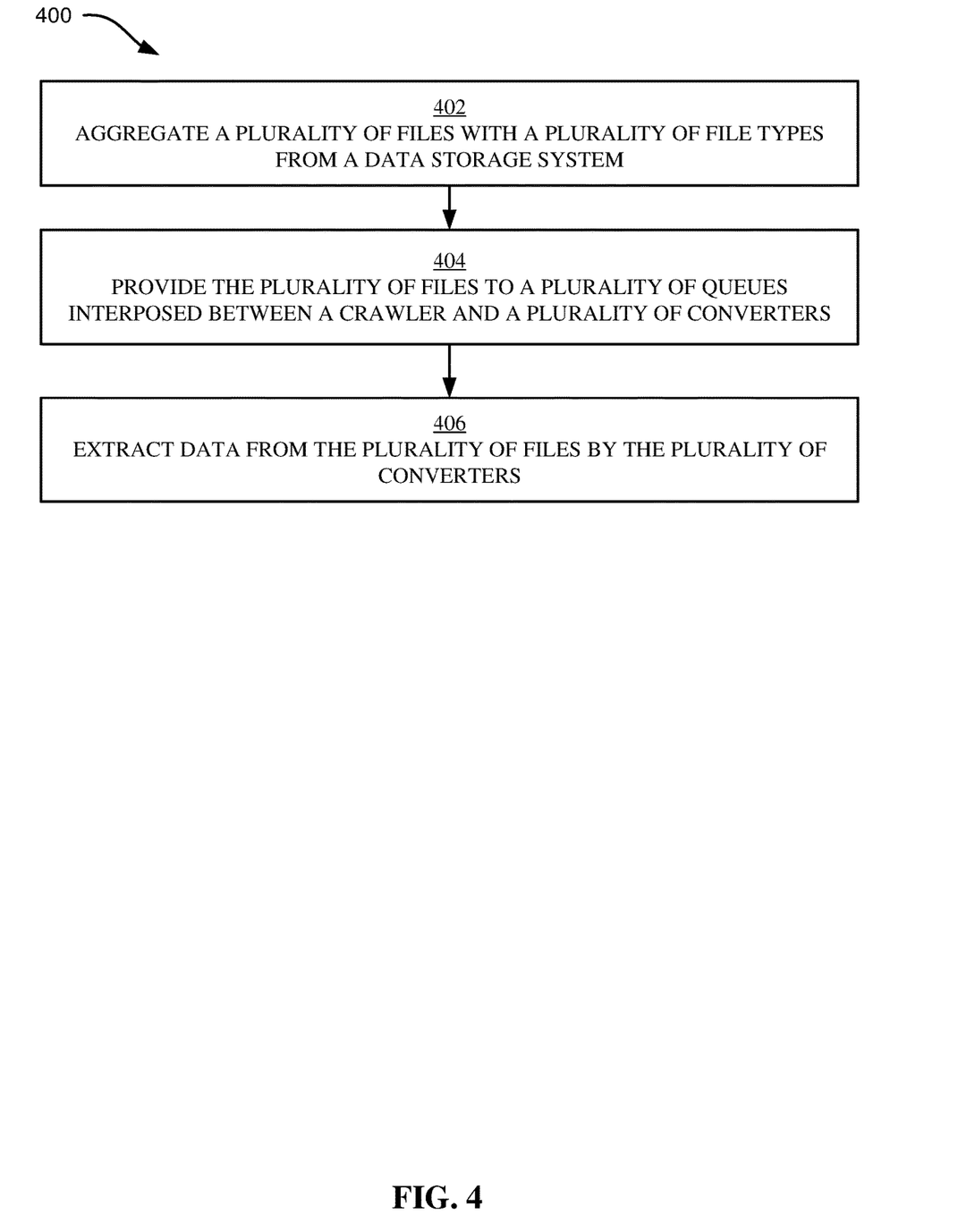
FIG. 4 illustrates a flowchart of an example general method for processing crawled data using a plurality of queues respectively associated with a plurality of converters, in accordance with some embodiments of the present disclosure.

FIG. 4 illustrates a flowchart of an example general method 400 for processing crawled data using a plurality of queues respectively associated with a plurality of converters, in accordance with some embodiments of the present disclosure. The method 400 can be implemented by, for example, a content mining system 124 of FIG. 1, a subsystem 200 of FIG. 2, a computer, a server, a processor, or another combination of hardware and/or software.

Operation 402 includes aggregating a plurality of files with a plurality of file types from a data storage system. In some embodiments, operation 402 is performed by a crawler of a content mining system. In some embodiments, the data storage system comprises a tape drive storage system. In such embodiments, the crawler can iterate through files in the tape drive storage system according to respective offsets of the files (e.g., sequential starting offset values) in order to reduce head movement of the tape drive storage system.

Operation 404 includes providing the plurality of files to a plurality of queues interposed between the crawler and a plurality of converters. In some embodiments, respective queues have a customized size (e.g., number of files of a specific file type they can hold) based on a processing speed of the corresponding converter for the specific file type. In other words, in some embodiments, queue sizes are inversely proportional to the processing speed of the corresponding converters (e.g., slower (larger) processing times result in a queue configured to hold fewer files while faster (shorter) processing times result in a queue configured to hold more files).

Operation 406 includes extracting data from the plurality of files by the plurality of converters. Advantageously, each of the plurality of queues can respectively provide files to the plurality of converters to reduce downtime (thereby increasing throughput and efficiency) of the plurality of converters and the crawler.

Figure 5:
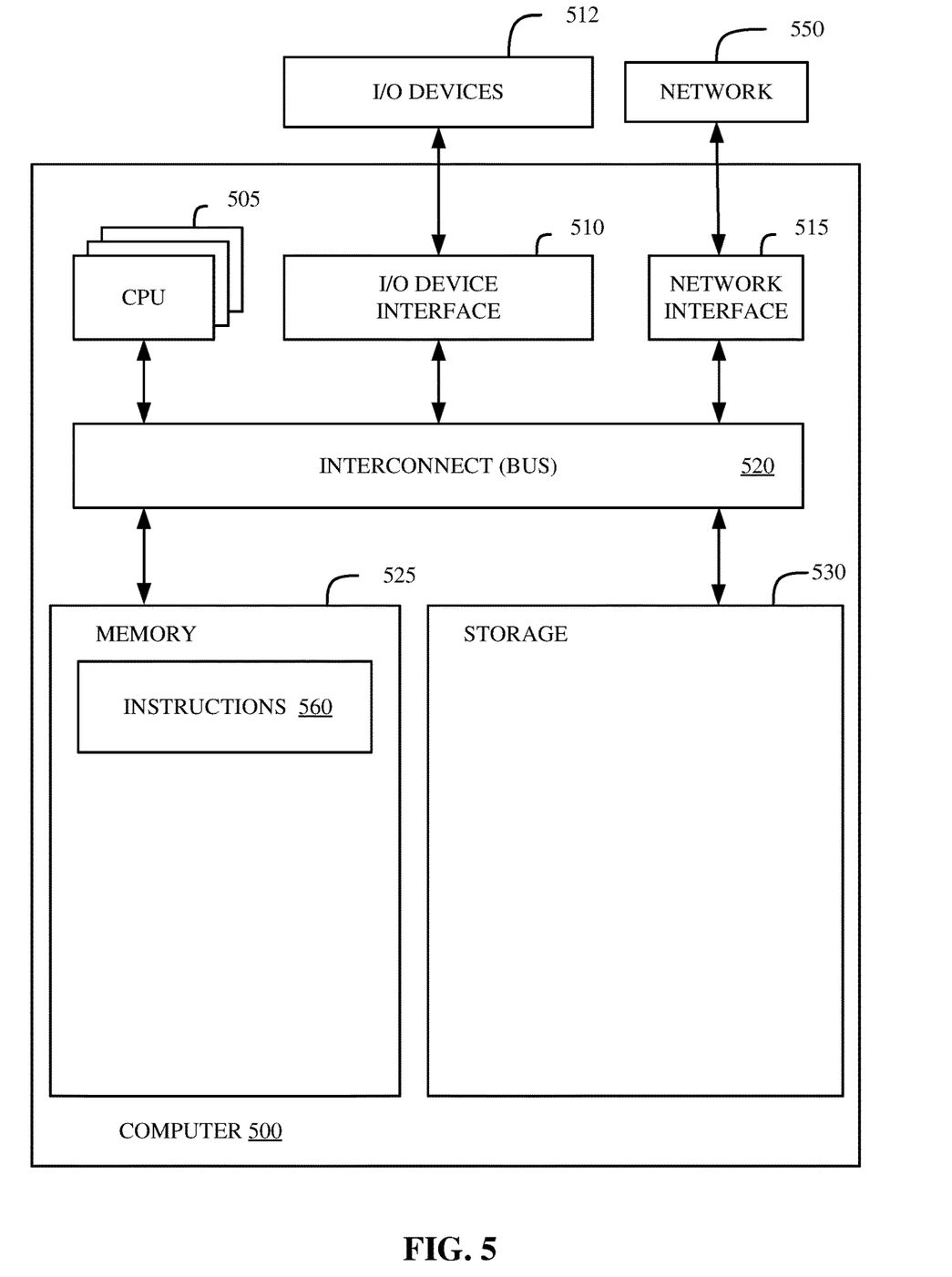
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all portions of the methods described in FIGS. 3-4 and/or implement the functionality discussed in FIGS. 1-2. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine such that the client machine executes the method, or a portion of the method, based on the instructions provided by computer 500. In some embodiments, the computer 500 is incorporated into (or functionality similar to computer 500 is virtually provisioned to) one or more entities illustrated in FIGS. 1-2 and/or other aspects of the present disclosure.

Computer 500 includes memory 525, storage 530, interconnect 520 (e.g., a bus), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more buses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the methods of FIGS. 3-4 and/or implement the functionality discussed in FIGS. 1-2. Although instructions 560 are shown in memory 525, instructions 560 can include program instructions collectively stored across numerous computer-readable storage media and executable by one or more CPUs 505.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
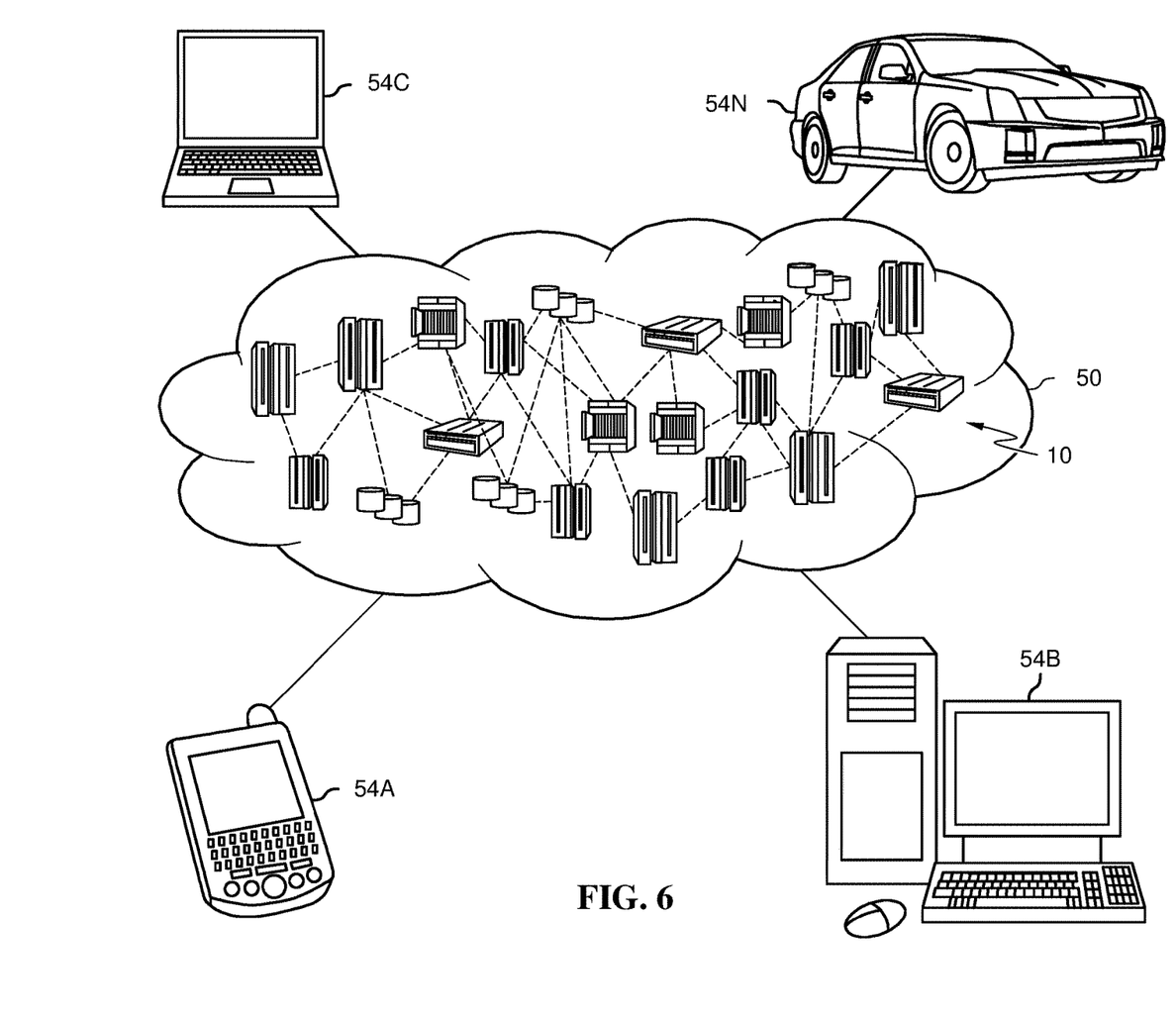
FIG. 6 depicts a cloud computing environment, in accordance with some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
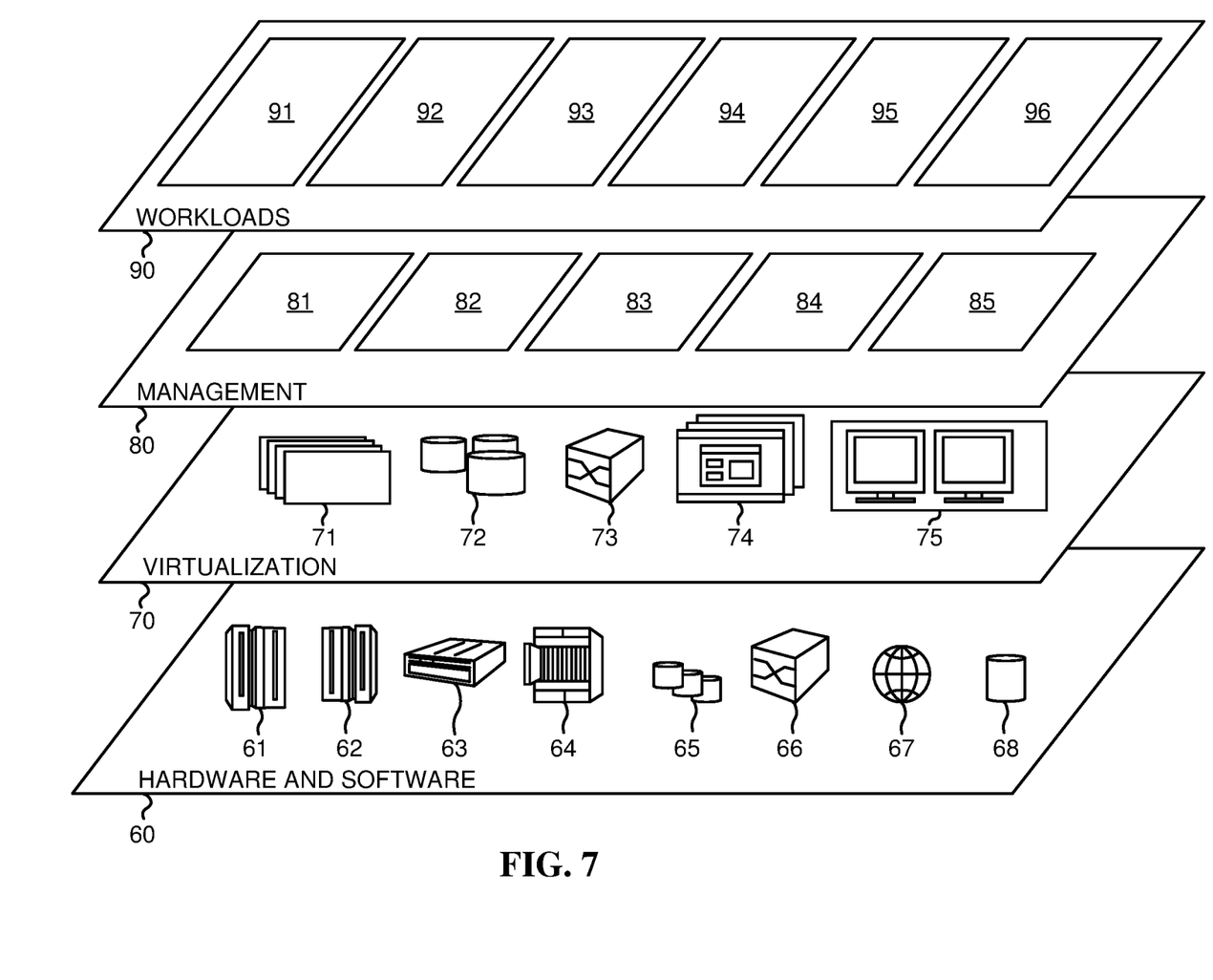
FIG. 7 depicts abstraction model layers, in accordance with some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data crawling using a plurality of queues for a plurality of converters 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the methods described with respect to FIGS. 3-4 and/or implement the functionality discussed in FIGS. 1-2 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a content mining system comprising: a crawler configured to retrieve a plurality of files from a data storage system; a plurality of converters configured to extract data from the plurality of files retrieved by the crawler from the data storage system, wherein each of the plurality of converters is configured to process a respective type of data; and a plurality of queues interposed between the crawler and the plurality of converters, wherein each queue is associated with a single converter.

Example 2 includes the content mining system of example 1, including or excluding optional features. In this example, each queue of the plurality of queues is respectively sized based on a processing speed of a corresponding converter. Optionally, the queue sizes are inversely related to converter processing speeds. Optionally, a first queue corresponding to a first converter with a first processing speed for a first file type is sized to store a first number of files of the first file type, wherein a second queue corresponding to a second converter with a second processing speed for a second file type is sized to store a second number of files of the second file type, wherein the first processing speed is greater than the second processing speed, and wherein the first number of files is less than the second number of files.

Example 3 includes the content mining system of any of examples 1 to 2, including or excluding optional features. In this example, the data storage system is a tape drive storage system. Optionally, the crawler is further configured to iterate through the plurality of files on the tape drive storage system based on sequential starting offsets of the files.

Example 4 includes the content mining system of any of examples 1 to 3, including or excluding optional features. In this example, the plurality of converters include at least a Comma Separated Value (CSV) converter, a JavaScript® Object Notation (JSON) converter, and a HyperText Markup Language (HTML) converter.

Example 5 is a computer-implemented method comprising aggregating, by a crawler, a plurality of files with a plurality of file types from a data storage system; providing the plurality of files to a plurality of queues interposed between the crawler and a plurality of converters, wherein files with a respective file type are sent to respective queues corresponding to a converter configured to process the files with the respective file type; and extracting data from the plurality of files by the plurality of converters, wherein the plurality of converters incrementally process the plurality of files using the plurality of queues.

Example 6 includes the method of example 5, including or excluding optional features. In this example, each queue of the plurality of queues is respectively sized based on a processing speed of a corresponding converter. Optionally, queue sizes are inversely related to converter processing speeds. Optionally, a first queue corresponding to a first converter with a first processing speed for a first file type is sized to store a first number of files of the first file type, wherein a second queue corresponding to a second converter with a second processing speed for a second file type is sized to store a second number of files of the second file type, wherein the first processing speed is greater than the second processing speed, and wherein the first number of files is less than the second number of files.

Example 7 includes the method of any of examples 5 to 6, including or excluding optional features. In this example, the data storage system is a tape drive storage system. Optionally, the crawler is further configured to iterate through the plurality of files on the tape drive storage system based on sequential starting offsets of the plurality of files.

Example 8 includes the method of any of examples 5 to 7, including or excluding optional features. In this example, the plurality of converters include at least a Comma Separated Value (CSV) converter, a JavaScript® Object Notation (JSON) converter, and a HyperText Markup Language (HTML) converter.

Example 9 includes the method of any of examples 5 to 8, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 10 is a system. The system comprises one or more computer readable storage media storing program instructions; and one or more processors which, in response to executing the program instructions, are configured to perform a method according to any one of examples 5 to 9.

Example 11 is a computer program product. The computer program product comprises one or more computer readable storage media, and program instructions collectively stored on the one or more computer readable storage media, the program instructions comprising instructions configured to cause one or more processors to perform a method according to any one of examples 5 to 9.

What is claimed is:

1. A content mining system comprising:
a crawler configured to retrieve a plurality of files from a tape drive storage system by iterating through the plurality of files on the tape drive storage system based on sequential starting offsets of the files;
a plurality of converters configured to extract data from the plurality of files retrieved by the crawler from the tape drive storage system, wherein each of the plurality of converters is configured to process a respective type of data; and
a plurality of queues interposed between the crawler and the plurality of converters, wherein each queue is associated with a single converter.

2. The content mining system of claim 1, wherein each queue of the plurality of queues is respectively sized based on a processing speed of a corresponding converter.

3. The content mining system of claim 2, wherein queue sizes are inversely related to converter processing speeds.

4. The content mining system of claim 2, wherein a first queue corresponding to a first converter with a first processing speed for a first file type is sized to store a first number of files of the first file type, wherein a second queue corresponding to a second converter with a second processing speed for a second file type is sized to store a second number of files of the second file type, wherein the first processing speed is greater than the second processing speed, and wherein the first number of files is less than the second number of files.

5. The content mining system of claim 1, wherein the plurality of converters include at least a Comma Separated Value (CSV) converter, a JavaScript® Object Notation (JSON) converter, a HyperText Markup Language (HTML) converter, and a Smart Document Understanding (SDU) converter.

6. A computer-implemented method comprising:
- aggregating, by a crawler, a plurality of files with a plurality of file types from a tape drive storage system by iterating through the plurality of files on the tape drive storage system based on sequential starting offsets of the files;
- providing the plurality of files to a plurality of queues interposed between the crawler and a plurality of converters, wherein files with a respective file type are sent to respective queues corresponding to a converter configured to process the files with the respective file type; and
- extracting data from the plurality of files by the plurality of converters, wherein the plurality of converters incrementally process the plurality of files using the plurality of queues.

7. The method of claim 6, wherein each queue of the plurality of queues is respectively sized based on a processing speed of a corresponding converter.

8. The method of claim 7, wherein queue sizes are inversely related to converter processing speeds.

9. The method of claim 7, wherein a first queue corresponding to a first converter with a first processing speed for a first file type is sized to store a first number of files of the first file type, wherein a second queue corresponding to a second converter with a second processing speed for a second file type is sized to store a second number of files of the second file type, wherein the first processing speed is greater than the second processing speed, and wherein the first number of files is less than the second number of files.

10. The method of claim 6, wherein the plurality of converters include at least a Comma Separated Value (CSV) converter, a JavaScript® Object Notation (JSON) converter, and a HyperText Markup Language (HTML) converter.

11. The method of claim 6, wherein the method is performed by one or more computers according to software that is downloaded to the one or more computers from a remote data processing system.

12. The method of claim 11, wherein the method further comprises:
- metering a usage of the software; and
- generating an invoice based on metering the usage.

13. A computer program product comprising one or more computer readable storage media, and program instructions collectively stored on the one or more computer readable storage media, the program instructions comprising instructions configured to cause one or more processors to perform a method comprising:
- aggregating, by a crawler, a plurality of files with a plurality of file types from a tape drive storage system by iterating through the plurality of files on the tape drive storage system based on sequential starting offsets of the files;
- providing the plurality of files to a plurality of queues interposed between the crawler and a plurality of converters, wherein files with a respective file type are sent to respective queues corresponding to a converter configured to process the files with the respective file type; and
- extracting data from the plurality of files by the plurality of converters, wherein the plurality of converters incrementally process the plurality of files using the plurality of queues.

14. The computer program product of claim 13, wherein each queue of the plurality of queues is respectively sized based on a processing speed of a corresponding converter.

15. The computer program product of claim 14, wherein queue sizes are inversely related to converter processing speeds.

\* \* \* \* \*